Nov. 6, 1945.  L. A. GARDINER  2,388,320
MACHINE TOOL ATTACHMENT
Filed July 19, 1943  6 Sheets-Sheet 1

Inventor
*Linzie Artemas Gardiner*

By *Clarence A. O'Brien
and Harvey B. Jacobson*
Attorneys

Nov. 6, 1945. L. A. GARDINER 2,388,320
MACHINE TOOL ATTACHMENT
Filed July 19, 1943 6 Sheets-Sheet 4
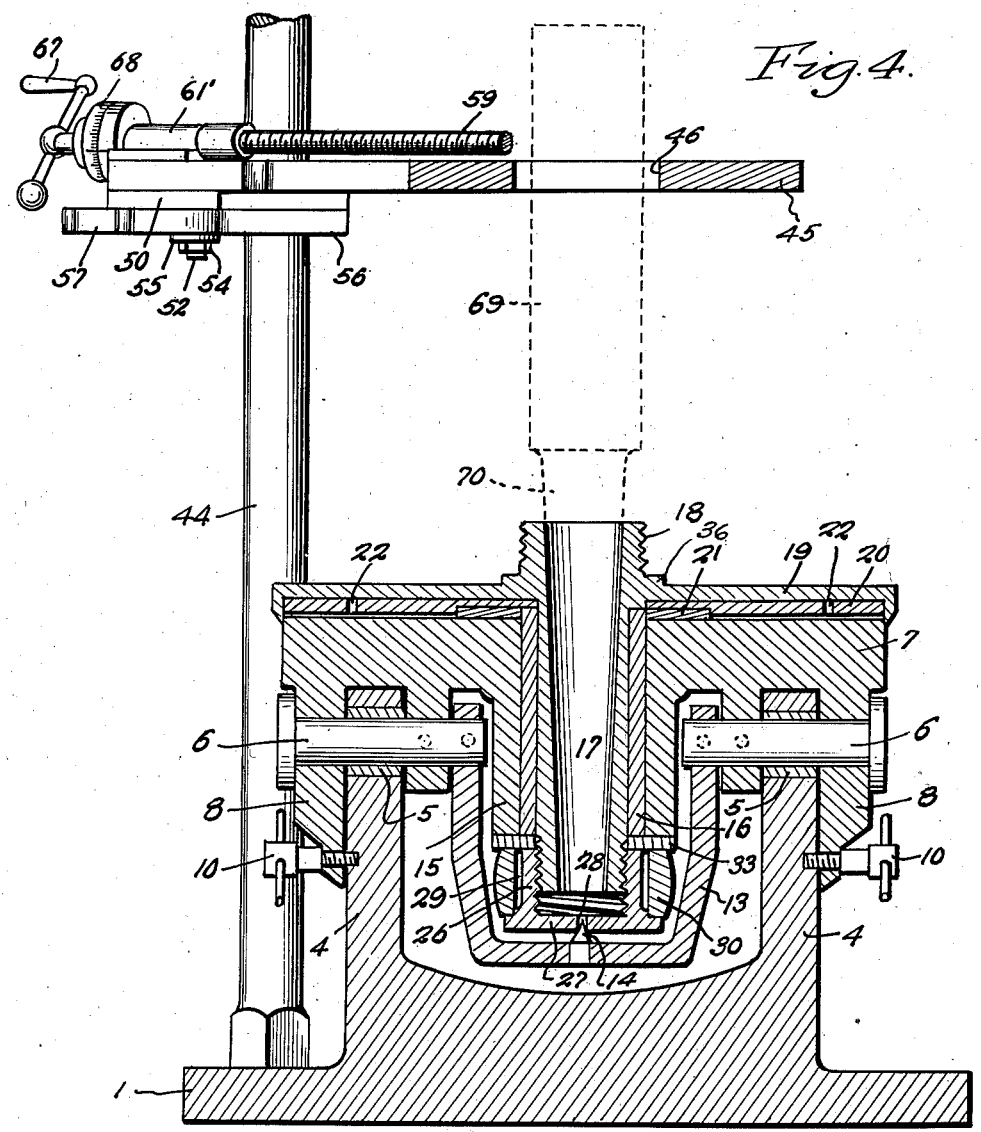
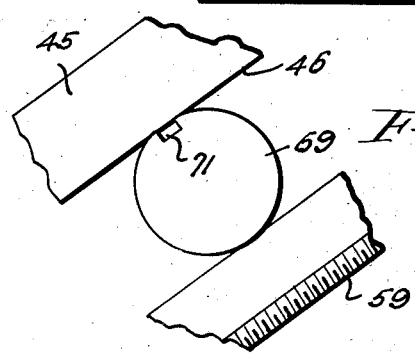
Inventor
Linzie Artemas Gardiner Nov. 6, 1945.   L. A. GARDINER   2,388,320
MACHINE TOOL ATTACHMENT
Filed July 19, 1943   6 Sheets-Sheet 5
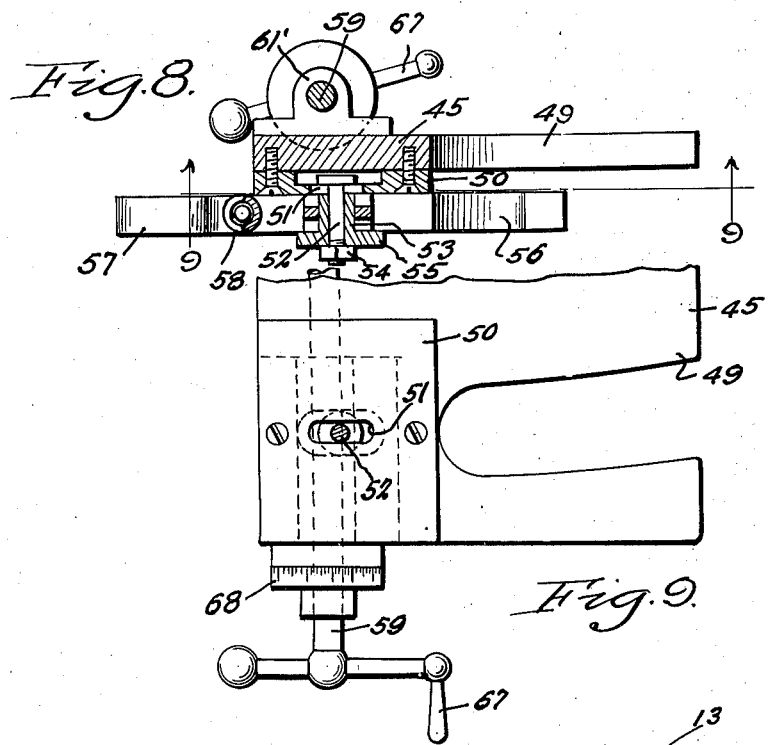
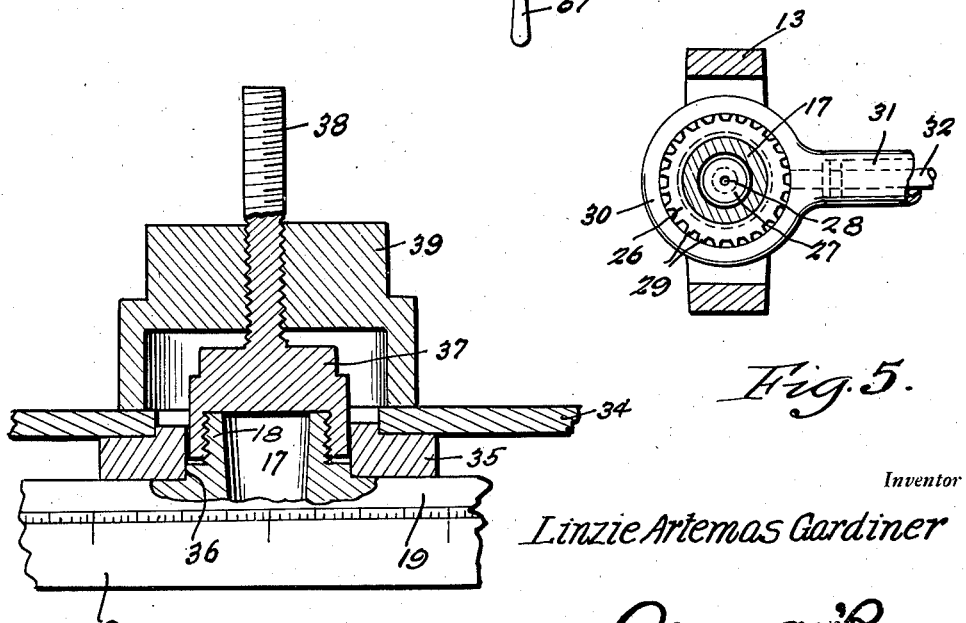
Inventor
Linzie Artemas Gardiner
By Clarence A. O'Brien
and Harvey B. Jacobson
Attorneys Nov. 6, 1945.  L. A. GARDINER  2,388,320
MACHINE TOOL ATTACHMENT
Filed July 19, 1943  6 Sheets-Sheet 6

Inventor
Linzie Artemas Gardiner
By Clarence A. O'Brien
and Harvey B. Jacobson
Attorneys Patented Nov. 6, 1945

2,388,320

UNITED STATES PATENT OFFICE 2,388,320

MACHINE TOOL ATTACHMENT

Linzie Artemas Gardiner, Lexington, Ky.

Application July 19, 1943, Serial No. 495,331

3 Claims. (Cl. 77—64)

The present invention relates generally to work holders for various types of machine tools, such as drilling machines, shaping or planing machines, milling machines, etc.

An important object of the invention is to provide an attachment for machines of the aforementioned character which eliminates the necessity of laying out the work and which, further, is adapted to be expeditiously and accurately adjusted to hold said work in any position.

Another very important object of the invention is to provide a machine tool attachment of the character described comprising novel means for locking the work holder in adjusted position as well as for releasing and freeing said work holder simultaneously in one operation.

Still another very important object of the invention is to provide a work holding attachment of the character described for machine tools which comprises unique means for accurately centering and guiding a drill over the work.

Other objects of the invention are to provide a machine tool attachment which will be comparatively simple in construction, strong, durable, highly efficient and reliable in use, compact, and which may be manufactured at low cost.

All of the foregoing and still further objects and advantages of the invention will become apparent from a study of the following specification taken in connection with the accompanying drawings wherein like characters of reference designate corresponding parts throughout the several views, and wherein—

Figure 4 is a vertical sectional view, taken substantially on the line 4—4 of Figure 2.

Figure 5 is a view in horizontal section, taken substantially on the line 5—5 of Figure 3.

Figure 8 is a cross sectional view through the free end portion of the horizontally swinging guide arm, taken substantially on the line 8—8 of Figure 1.

Figure 9 is a view in horizontal section, taken substantially on the line 9—9 of Figure 8.

Figure 10 is a view in vertical section through the work-clamping means.

Figure 11 is a top plan view, illustrating the means for centering the drill guide arm over the index plate.

Figure 1:
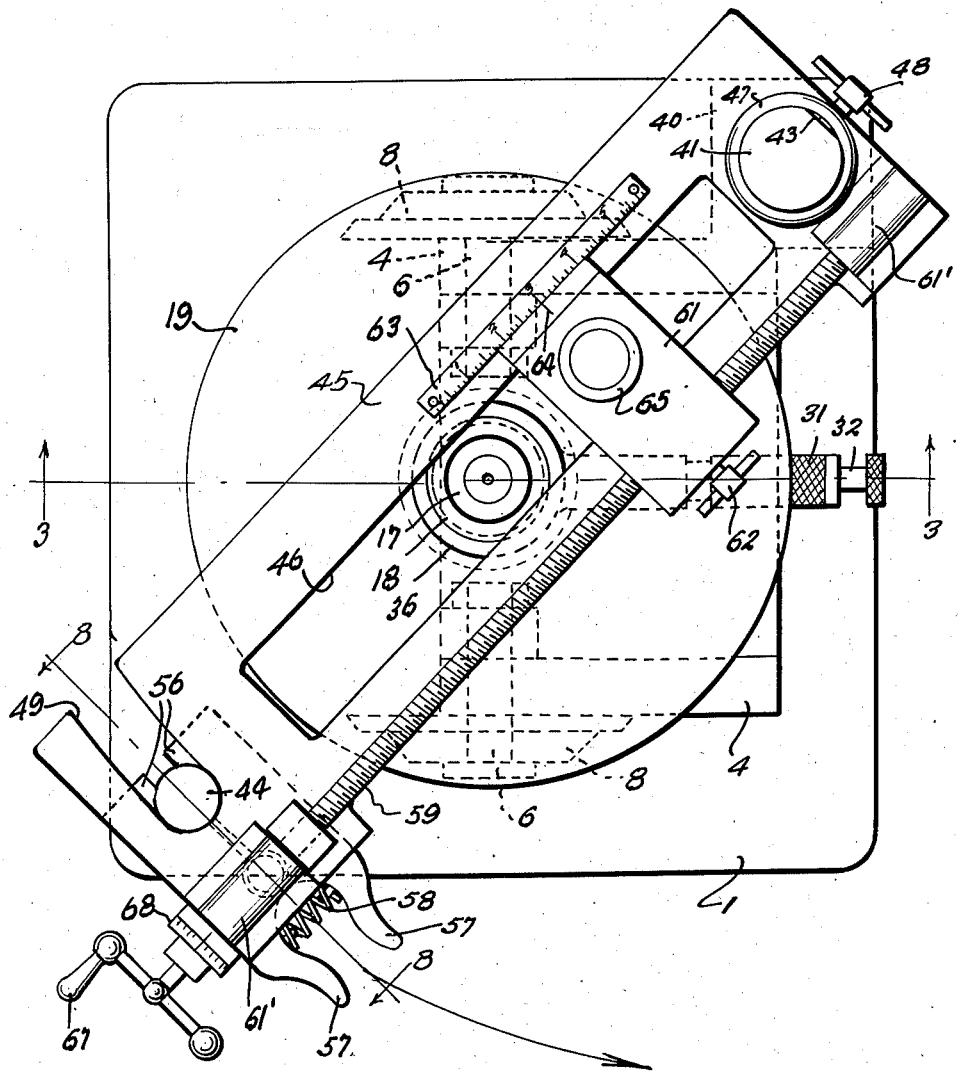
Figure 1 is a top plan view of a machine tool attachment constructed in accordance with the present invention, showing the device assembled for use on a drilling machine.
Figure 2:
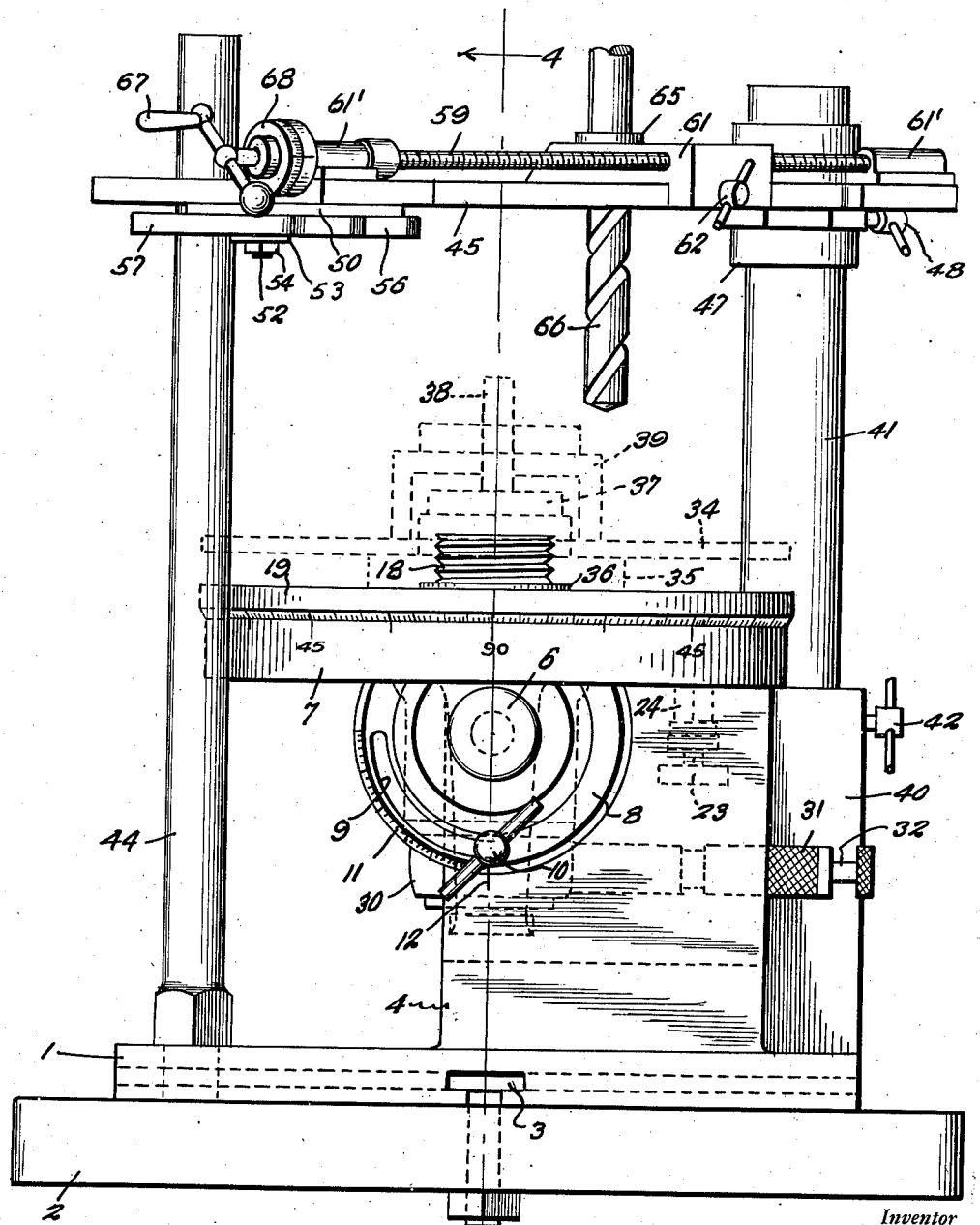
Figure 2 is an elevational view of the device.

Referring now to the drawings in detail, it will be seen that the embodiment of the invention which has been illustrated comprises a metallic base 1 which is adjustably secured to the machine bed 2 by bolts 3. Rising from the base 1 is a pair of spaced, opposed plate-like brackets 4 having aligned bearings 5 in their upper portions adjacent one of the vertical edges thereof.

Headed pins 6 are journaled in the bearings 5. Fixed on the pins 6 for swinging adjustment in a vertical plane is a circular master plate 7 of suitable metal. The master plate 7 comprises depending segments 8 through which the pins 6 pass, said segments having arcuate slots 9 therein which accommodate thumb screws 10 for securing said plate 7 in adjusted position. The screws 10 are threadedly mounted in the brackets 4. Scales 11 on the segments 8 facilitate adjusting the master plate 7 to the desired inclination, said scales being cooperable with center marks 12 on the brackets 4. Fixed on the inner end portions of the pins 6 is a depending yoke 13. A conical thrust bearing 14 is mounted in the yoke 13, the purpose of which will be presently set forth.

The master plate 7 further includes a centrally located, tubular bearing 15 which depends into the yoke 13. Mounted in the bearing 15 is a bushing 16. An internally tapered, tubular stem 17 is journaled in the bushing 16. The stem 17 comprises an enlarged, externally threaded upper end portion 18. Formed integrally with the stem 17, below the portion 18 thereof, is a circular, peripherally calibrated index plate 19. The index plate 19 comprises a removable disk 20 which is recessed into the lower face of said index plate. A thrust washer or bearing 21 spaces the disk 20 from the master plate 7 and carries the load, said thrust washer encircling the upper end portion of the bushing 16.

Figure 3:
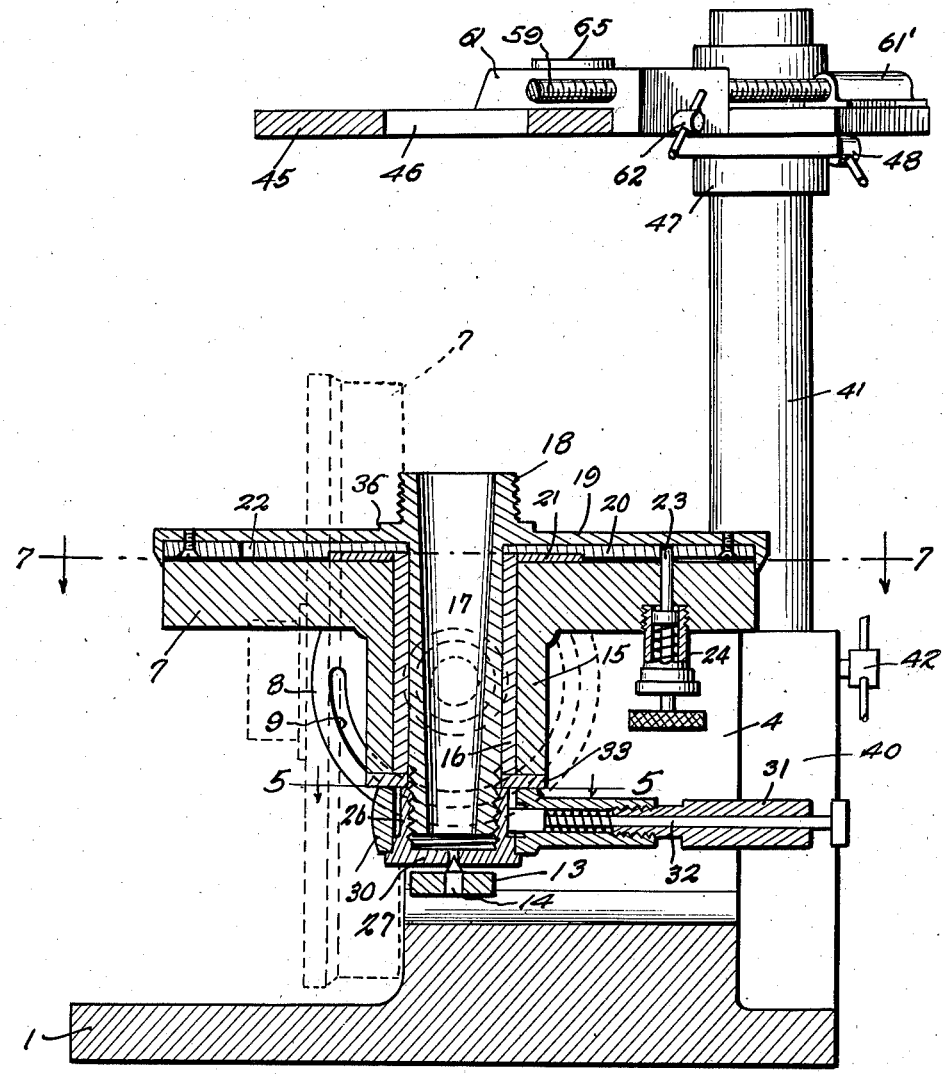
Figure 3 is a vertical sectional view, taken substantially on the line 3—3 of Figure 1.
Figure 6:
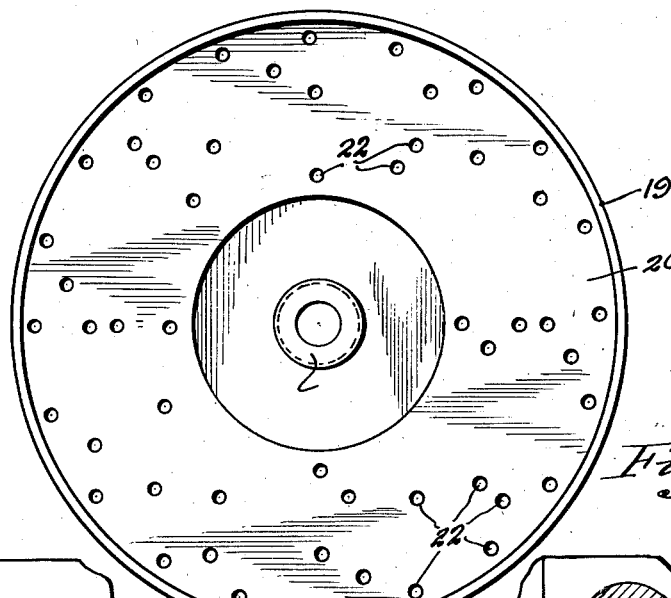
Figure 6 is a bottom plan view of the rotatably adjustable index plate.
Figure 7:
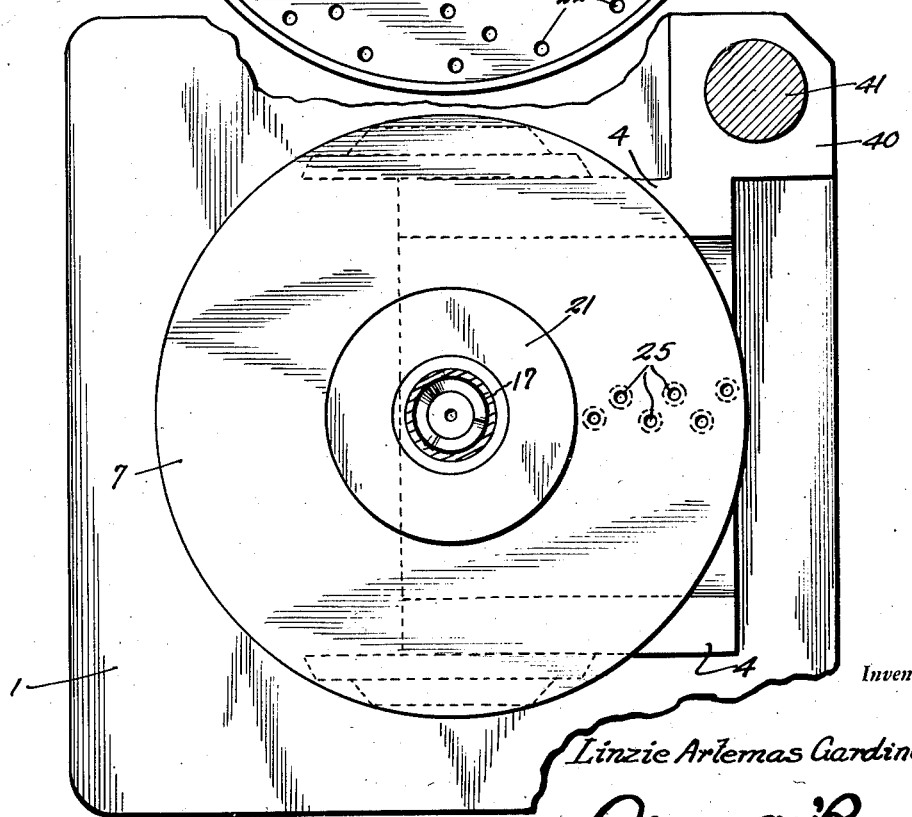
Figure 7 is a view in horizontal section, taken substantially on the line 7—7 of Figure 3.

As illustrated to advantage in Figure 6 of the drawings, the disk 20 has formed therein concentric series of openings 22, the circumferential spacing of which varies. Mounted beneath the master plate 7 and projecting upwardly therethrough for engagement in the openings 22 is a spring pressed, manually retracted locking bolt 23 (see Figure 3) for arresting the index plate 19 in the desired positions. The bolt 23 is slidably mounted in a removable housing 24 which is threadedly mounted in the lower portion of the master plate 7. The master plate 7 has formed therein staggered threaded openings 25 (see Figure 7) in which the housing 24 is insertable selectively for mounting the bolt 23 in the path of the desired series of openings 22.

The lower end portion of the stem 17 is also externally threaded and mounted thereon is a nut 26 comprising a closed lower end 27 having a centrally located opening 28 therein in which the conical thrust bearing 14 is engaged. The nut 26 is further provided, on its periphery, with ratchet teeth 29. An eye 30 on one end of a hand lever 31 is rotatable about the nut 26. A spring pressed, manually retracted, reversible pawl 32 is slidably mounted in the lever 31 and engageable with the ratchet teeth 29 for operatively connecting the nut 26 to said lever for actuation in either direction thereby. A ring 33 is mounted between the nut 26 and the lower end of the bushing 16 and the tubular bearing 15.

Referring now to Figure 10 of the drawings, the work, as at 34, in the arrangement which has been illustrated, is mounted in position on the index plate 19 in vertically spaced relation thereto by means including a spacing ring 35. The ring 35 encircles the portion 18 of the stem 17 in spaced, concentric relation thereto, said ring slipping over an annular shoulder 36 which rises from the plate 19. A cap 37 is threaded on the upstanding neck 18. Rising from the cap 37 is a threaded shank 38. A substantially cup-shaped nut 39 is threadedly mounted on the shank 38 and is engageable with the work 34 over the cap 37 for firmly clamping said work on the spacing ring 35.

Also rising from the base 1 is a socket 40. A post 41 is journaled in the socket 40. A thumb screw 42 on the socket 40 is engageable with a flat portion 43 of the post 41 for securing said post against rotation in adjusted position. Also rising from the base 1, on the diametrically opposite side of the master plate 7 from the post 41, is a comparatively small post 44. The posts 41 and 44 may be readily removed from the base 1.

Fixed on the post 41 for swinging movement in a horizontal plane is a plate-like arm 45 having a longitudinal slot or opening 46 therein. The arm 45 is provided, in one end portion, with a hub or the like 47 which is secured on the post 41 by a thumb screw 48. The thumb screw 48 is also engageable with the flat side portion 43 of the post 41. In its free end portion, the arm 45 has extending thereinto from one of its longitudinal edges a notch or recess 49 for the reception of the post 44.

Referring to Figures 8 and 9 of the drawings, it will be observed that a chambered plate 50 is mounted beneath the free end of the arm 45, said plate having formed therein a transverse slot 51. A bolt 52 depends from the plate 50 and is adjustable in the slot 51. A bushing 53 is secured by a nut 54 on the bolt 52, said bushing abutting the plate 50. The bushing 53 includes a flange 55 on its lower end. Journaled on the bushing 53 is a pair of opposed, coacting jaws 56 which are adapted to receive the post 44 therebetween for releasably securing the arm 45 thereto. Operating handles 57 project from the pivoted ends of the jaws 56. A coil spring 58 is mounted between the handles 57 for closing the jaws 56. It will thus be seen that the jaws 56 are mounted for transverse adjustment beneath the free end portion of the arm 45 whereby said arm, when it is connected to the post 44, may be adjusted relative thereto to maintain accuracy.

A screw shaft 59 is journaled longitudinally on the arm 45, adjacent one of the longitudinal edges thereof, in suitable bearings 61'. A drill guide 61 is threadedly mounted on the screw shaft 59 and slidable thereby on the arm 45, said drill guide bridging the slot 46 and being engaged therein. A set screw 62 is threadedly mounted in one end of the guide 61 and engageable with the adjacent longitudinal edge of the arm 45 for frictionally clamping said guide in adjusted position. The other end of the guide 61 travels adjacent a scale 63 which is mounted longitudinally on the arm 45 in parallelism with the slot 46. This end portion of the guide 61 is beveled and provided with a mark 64 which is cooperable with the scale 63. A vertical tube 65 in the guide 61 receives the tool, as at 66. An operating crank 67 is provided on one end of the screw 59. A vernier 68 on the screw shaft 59 facilitates fine adjusting of the guide 61.

When mounting the tool guide assembly on the base 1, a post 69 is provided for accurately positioning the arm 45 above the index plate 19. Toward this end, the post 69 includes, on its lower end, a tapered shank 70 which is adapted to seat in the stem 17. The post 69 fits snugly in the slot 46 in the arm 45. A channel 71 in the post 69 provides the equivalent of a comparatively wide surface which is slidably engageable with one of the longitudinal side walls of the slot 46 (see Figure 11).

It is thought that the operation of the device will be readily apparent from a consideration of the foregoing, particularly to those skilled in the art to which the invention pertains. Briefly, with the device assembled and mounted for use on a drilling machine, the work 34 is firmly secured in position above the index plate 19. Of course, the tool 66 is moved downwardly through the tube 65 of the guide 61 for engagement with the work. Prior to the engagement of the tool 66 in the guide 61, said guide is adjusted on the arm 45 through the medium of the screw 59 to the desired position. The bolt 23 is mounted in the master plate 7 for engagement in the correct openings 22 in the disk 20. The nut 26 is tightened through the medium of the ratchet lever 31 for drawing the plate 19, with the work thereon, down tightly on the master plate 7, the thrust washer 21 receiving the load. The work may now be drilled. To release the index plate 19 for rotating the work to the next position, the pawl 32 is manually retracted and rotated one-half of a revolution for reversing said pawl. The ratchet lever 31 is then actuated for unscrewing or loosening the nut 26. As the nut 26 is thus unscrewed, said nut, turning on the thrust bearing 14, forces the stem 17 upwardly, thereby raising the plate 19 with the work thereon. The bolt 23 is then withdrawn and the plate 19 may be manually rotated with a minimum of effort. When the position of the next drilling operation is reached, the bolt 23 engages in the correct opening 22 and arrests the plate 19. Rocking or swinging adjustment of the master plate 7 facilitates the drilling of holes at different angles in the work. When the attachment is to be used on shaping or planing, milling and other machines, the tool guide assembly comprising the members 41, 44, 45, etc., is removed.

It is believed that the many advantages of a machine tool attachment constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A machine tool attachment of the character described comprising a base for mounting on a machine tool, brackets rising from said base, pins journaled in said brackets, a circular plate fixed on the pins for rocking adjustment in a vertical plane, a yoke fixed on the pins, the rockable plate including a centrally located, tubular bearing extending into the yoke, a stem journaled in the bearing, a circular plate fixed on the stem and rotatable above the rockable plate, means for securing a piece of work on the rotatable plate, a thrust bearing mounted on the yoke, a nut threadedly mounted on the stem and rotatably engaged with the thrust bearing, said nut being operatively connected to the tubular bearing, and manually operable means for rotating the nut in opposite directions for securing the rotary plate against rotation on the rockable plate and for freeing said rotary plate from said rockable plate.

2. In a machine tool attachment, a master plate having a central depending tubular bearing, an index plate disposed upon the master plate and having a depending tubular stem journaled on said bearing, said stem having a projecting threaded lower end, a ring loosely disposed on the stem and engaged with the lower end of the bearing, a nut threaded on the lower end of the stem below the ring and having peripheral ratchet teeth, and a lever having an end rotatably mounted on the nut and provided with a reversible pawl engageable with the ratchet teeth of the nut so that the lever may be used to turn the nut in either direction to draw the index plate down tightly against the master plate or to free the index plate from tight engagement with the master plate.

3. The construction defined in claim 2, in combination with a yoke extending beneath the nut, and a thrust bearing between the yoke and the nut whereby the stem and index plate are raised relative to the master plate when the nut is turned to free the index plate.

LINZIE ARTEMAS GARDINER.